United States Patent
Sharifi et al.

(10) Patent No.: US 12,445,468 B2
(45) Date of Patent: Oct. 14, 2025

(54) SYSTEMS AND METHODS FOR GENERATING AND SELECTING LOCAL CONTENT TO IMPROVE SECURITY AND UTILIZATION OF NETWORK RESOURCES

(71) Applicant: GOOGLE LLC, Mountain View, CA (US)

(72) Inventors: Matthew Nirvan Sharifi, Mountain View, CA (US); David Petrou, Mountain View, CA (US)

(73) Assignee: GOOGLE LLC, Mountain View, CA (US)

(*) Notice: Subject to any disclaimer, the term of this patent is extended or adjusted under 35 U.S.C. 154(b) by 982 days.

(21) Appl. No.: 17/278,580

(22) PCT Filed: Mar. 13, 2020

(86) PCT No.: PCT/US2020/022728
§ 371 (c)(1),
(2) Date: Mar. 22, 2021

(87) PCT Pub. No.: WO2021/183143
PCT Pub. Date: Sep. 16, 2021

(65) Prior Publication Data
US 2022/0116410 A1     Apr. 14, 2022

(51) Int. Cl.
*G06F 13/00*     (2006.01)
*H04L 9/40*      (2022.01)
(Continued)

(52) U.S. Cl.
CPC ...... *H04L 63/1425* (2013.01); *H04L 63/1416* (2013.01); *H04L 67/10* (2013.01);
(Continued)

(58) Field of Classification Search
CPC . H04L 63/1425; H04L 63/1416; H04L 67/10; H04L 67/535; H04N 21/21815;
(Continued)

(56) References Cited

U.S. PATENT DOCUMENTS

| | | | | |
|---|---|---|---|---|
| 7,997,485 B2* | 8/2011 | Flake | ........... | H04L 63/102 |
| | | | | 235/383 |
| 9,135,626 B2* | 9/2015 | Koli | ........... | G06Q 30/0267 |

(Continued)

FOREIGN PATENT DOCUMENTS

| | | |
|---|---|---|
| CN | 104516910 A | 4/2015 |
| JP | 2016-66381 A | 4/2016 |
| KR | 10-2017-0055726 A | 5/2017 |

OTHER PUBLICATIONS

Office Action for Korean Application No. 10-2021-7009325, dated Feb. 15, 2022.
(Continued)

*Primary Examiner* — Kenneth R Coulter
(74) *Attorney, Agent, or Firm* — MARSHALL, GERSTEIN & BORUN LLP

(57) ABSTRACT

At least one aspect of the present disclosure is directed to systems and methods of generating on-device content items to improve security and network utilization. A client device can access content resources and category information from a data structure in the memory the memory of the client device. The client device can generate on-device content items based on the content resources and the category information. The client device can receive an indication to display a content item in an application executing on the client device. The client device can scan the client device for context information to create a relevant device context. The client device can select an on-device content item based on the relevant device context. The client device can provide the selected on-device item to the application for display,
(Continued)

detect an interaction with the displayed content item, and update a content selection model or a content generation model.

18 Claims, 6 Drawing Sheets

(51) Int. Cl.
    *H04L 67/10*     (2022.01)
    *H04L 67/50*     (2022.01)
    *H04N 21/218*     (2011.01)
    *H04N 21/24*     (2011.01)
    *H04N 21/6332*     (2011.01)
    *H04N 21/81*     (2011.01)
    *H04N 21/858*     (2011.01)

(52) U.S. Cl.
    CPC ..... *H04L 67/535* (2022.05); *H04N 21/21815* (2013.01); *H04N 21/2407* (2013.01); *H04N 21/6332* (2013.01); *H04N 21/8133* (2013.01); *H04N 21/858* (2013.01)

(58) Field of Classification Search
    CPC ........... H04N 21/2407; H04N 21/6332; H04N 21/8133; H04N 21/858
    USPC ...... 709/217–219, 203, 231; 705/14.49, 14.4
    See application file for complete search history.

(56) References Cited

U.S. PATENT DOCUMENTS

| | | | |
|---|---|---|---|
| 9,213,845 | B1 | 12/2015 | Taraki et al. |
| 10,855,697 | B2 * | 12/2020 | Butler .................... G06V 10/75 |
| 11,700,267 | B2 * | 7/2023 | Butler .................... G06F 18/22 |
| | | | 726/23 |
| 2008/0004949 | A1 | 1/2008 | Flake et al. |
| 2008/0004952 | A1 | 1/2008 | Koli |
| 2012/0005016 | A1 * | 1/2012 | Graff ................. G06Q 30/0641 |
| | | | 709/219 |
| 2012/0198347 | A1 | 8/2012 | Hirvonen et al. |
| 2015/0365465 | A1 * | 12/2015 | Devanneaux ....... G06F 16/9574 |
| | | | 709/217 |
| 2019/0007425 | A1 * | 1/2019 | Butler .................... G06F 18/22 |
| 2023/0224377 | A1 * | 7/2023 | Bathla ................ H04L 67/1097 |
| | | | 726/22 |

OTHER PUBLICATIONS

Notice of Reasons for Rejection for Japanese Application No. 2021-517810, dated Jun. 27, 2022.
International Search Report and Written Opinion for PCT Appln. Ser. No. PCT/US2020/022728 dated Nov. 23, 2020 (14 pages).
Jinghua et al., "Towards Secure and Practical Targeted Mobile Advertising", IEEE Conference on Computer Communications Workshops, IEEE, Apr. 26, 2015 (2 pages).
Khan et al., "CAMEO: A Middleware for Mobile Advertisement Delivery", Proceeding of the 11th Annual International Conference on Mobile Systems, Applications, and Services, MobiSys '13, vol. 13, Jun. 25-28, 2013, pp. 125-137 (13 pages).
First Examination Report for India Application No. 202127011601, dated Nov. 1, 2022.
Hearing Notice for India Application No. 202127011601, dated Feb. 20, 2024.

* cited by examiner

SYSTEMS AND METHODS FOR GENERATING AND SELECTING LOCAL CONTENT TO IMPROVE SECURITY AND UTILIZATION OF NETWORK RESOURCES

CROSS-REFERENCE TO RELATED APPLICATIONS

The present application is a National Stage Application, filed under 35 U.S.C. 371, of International Patent Application No. PCT/US2020/022728 filed on Mar. 13, 2020 titled "SYSTEMS AND METHODS FOR GENERATING AND SELECTING LOCAL CONTENT TO IMPROVE SECURITY AND UTILIZATION OF NETWORK RESOURCES," the entirety of which is incorporated by reference herein.

BACKGROUND

In a computer networked environment such as the internet, third-party content providers provide third-party content items for display on end-user computing devices. These third-party content items, for example, advertisements, can be displayed on a web page associated with a respective publisher. These third-party content items can include content identifying the third-party content provider that provided the content item.

However, selecting and providing third-party content to client devices can present risks to data security and unnecessarily utilize network resources. To provide a third-party content item, client devices can send context information to a third-part content provider, which can use the context information to select relevant content items for display on the client device. As a result, to display a relevant content item, at least two network transmissions must occur: one to provide device context information, and another to provide the selected content for the client device. This can subject the client device to data security risks, as the device context information is limited to the overall security of the network as soon as it leaves the device. Transmitting up-to-date device context information frequently to third-party content providers can result in over-utilization of network and computing resources.

SUMMARY

The systems and methods discussed herein enable a client device to access its own context information and generate on-device context information, thereby reducing the number of data transmissions to third-party content providers. Unlike other approaches, the systems and methods described herein can utilize on-device content generation and selection models to generate and select content items for display in applications on the client device. By using its own context information, the client device can generate one or more content items for display in real-time without transmitting any context information outside of the client device. Such techniques can reduce overall network utilization, power utilization, and computing resource utilization while increasing overall network system security by eliminating the requirement of sending the data to a third-party content provider. Furthermore, the techniques described herein can further refine the selection and generation models based on user interaction information with the on-device content items.

At least one aspect of the present disclosure is directed to a method for generating on-device content items to improve security and network resource utilization. The method can include accessing, by a client device including one or more processors and a memory, a plurality of content resources and a plurality of category information. The client device can access the plurality of interest resources and the plurality of category information, for example, from a data structure in the memory of the client device. The method can include generating, by the client device, a plurality of on-device content items based on the plurality of content resources and the plurality of category information. The method can include receiving, by the client device, from an application executing on the client device, an indication to display a content item. The method can include scanning, by the client device, device context information to create a relevant device context. The method can include selecting, by the client device, a relevant on-device content item from the plurality of on-device content items based on the relevant device context. The method can include providing, by the client device, the relevant on-device content item to the application for display on the client device.

In some implementations, the method can include detecting, by the client device, an interaction event associated with the relevant on-device content item. The method can include identifying, by the client device, interaction information based on the detected interaction event. The method can include transmitting, by the client device, the interaction information to a content provider server. In some implementations, the method can include receiving, by the client device, from the content provider server, additional content based on the interaction information. In some implementations, the method can include receiving, by the client device, from a content provider server, the plurality of content resources and the plurality of category information.

In some implementations, the method can include providing, by the client device, the plurality of content resources and the plurality of category information to a content generation model executing on the client device. The method can include receiving, by the client device, the plurality of on-device content items from an output of the content generation model. In some implementations, the method can include receiving, by the client device from a content provider server, the content generation model. In some implementations, the method can include providing, by the client device, the relevant device context to a content selection model executing on the client device. The method can include receiving, by the client device, an indication of the relevant on device content item of the plurality of on-device content items from an output of the content selection model.

In some implementations, the method can include receiving, by the client device from a content provider server, the content selection model. In some implementations, the method can include detecting, by the client device, an interaction event associated with the relevant on-device content item. The method can include updating, by the client device, the content generation model based at least one of the relevant context information or the interaction event. In some implementations, the method can include detecting, by the client device, an interaction event associated with the relevant on-device content item. The method can include updating, by the client device, the content selection model based at least one of the relevant context information or the interaction event.

At least one other aspect of the present disclosure is directed to a system including a client device, the client device comprising one or more processors and a memory. The client device can access a plurality of content resources and a plurality of category information from a data structure in the memory of the client device. The client device can generate a plurality of on-device content items based on the plurality of content resources and the plurality of category information. The client device can receive, from an application executing on the client device, an indication to display a content item. The client device can scan device context information to create a relevant device context. The client device can select a relevant on-device content item from the plurality of on-device content items based on the relevant device context. The client device can provide the relevant on-device content item to the application for display on the client device.

In some implementations, the client device can detect an interaction event associated with the relevant on-device content item. The client device can identify interaction information based on the detected interaction event. The client device can transmit the interaction information to a content provider server. In some implementations, the client device can receive, from the content provider server, additional content based on the interaction information. In some implementations, the client device can receive, from a content provider server, the plurality of content resources and the plurality of category information.

In some implementations, the client device can provide the plurality of content resources and the plurality of category information to a content generation model executing on the client device. The client device can receive the plurality of on-device content items from an output of the content generation model. In some implementations, the client device can receive, from a content provider server, the content generation model. In some implementations, the client device can provide the relevant device context to a content selection model executing on the client device. The client device can receive an indication of the relevant on device content item of the plurality of on-device content items from an output of the content selection model.

In some implementations, the client device can receive, from a content provider server, the content selection model. In some implementations, the client device can detect an interaction event associated with the relevant on-device content item. The client device can update the content generation model based at least one of the relevant context information or the interaction event. In some implementations, the client device can detect, an interaction event associated with the relevant on-device content item. The client device can update the content selection model based at least one of the relevant context information or the interaction event.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. Aspects can be combined and it will be readily appreciated that features described in the context of one aspect of the invention can be combined with other aspects. Aspects can be implemented in any convenient form. For example, by appropriate computer programs, which may be carried on appropriate carrier media (computer readable media), which may be tangible carrier media (e.g. disks) or intangible carrier media (e.g. communications signals). Aspects may also be implemented using suitable apparatus, which may take the form of programmable computers running computer programs arranged to implement the aspect.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
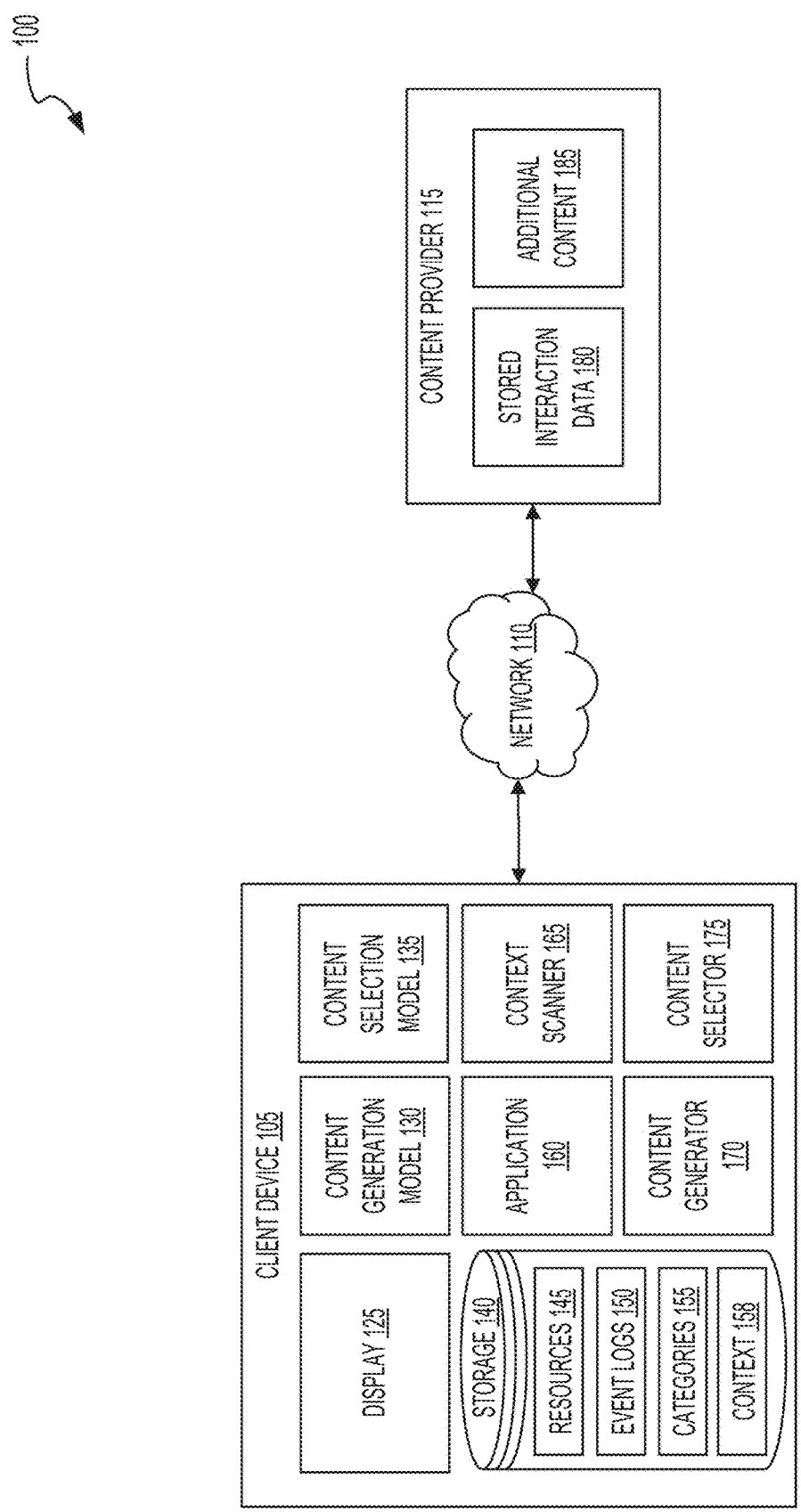
FIG. 1 shows a block diagram depicting an example system for generating on-device content items to improve security and network resource utilization.

Below are detailed descriptions of various concepts related to, and implementations of, methods, apparatuses, and systems of privacy preserving determination of intersection of sets of user identifiers. The various concepts introduced above and discussed in greater detail below may be implemented in any of numerous ways, as the described concepts are not limited to any particular manner of implementation.

Content provider platforms can select and provide relevant content items for presentation on client devices based on client device contextual signals, such as cookies, application usage information, and displayed text, among others. The client device can provide the contextual information to a content provider on a periodic basis, or in real-time to allow the content provider to select and provide content that is relevant to the context of the client device. For example, if the client device is displaying an article about a tropical location, the content provider may provide a content item related to a tropical vacation. In another example, where the client device is located in an area that is close to many restaurants, the content provider may use location information from the client device to provide one or more content items related to food or restaurants. Generally, the relevance of a content item to a particular device context is proportional to the amount of up-to-date context information transmitted to the content provider.

However, client device contextual information, such as device location and on-screen text, can change rapidly. To serve content items that are relevant to the most up-to-date client device context, the client device must transmit or provide contextual information in real-time, on a frequent periodic basis, or each time the client device context changes. This frequent transmission of information, coupled with the transmission of a content item from a content provider, can cause unnecessary computational resource utilization and network bandwidth utilization. Furthermore, transmitting contextual information can compromise the overall security of networking systems, because the client device context may include personal or protected information. When data is transmitted outside of a secure client device, it can become susceptible to man-in-the-middle attacks, data breaches, or other network vulnerabilities.

To address the foregoing issues, the systems and methods of this technical solution are broadly directed to a system for generating content items on a client device. In the event of an interaction with the generated content items, a signal can be provided to the content provider that includes information about the interaction, but may not include the device contextual information. Based on the interaction information, the content provider may select and transmit additional content items to the client device for display. By only transmitting data to the content provider in response to an interaction with generated content, the client device does not need to provide contextual information on a regular basis to the content provider, thereby reducing the overall network utilization of the system without hindering performance. Furthermore, the on-device content items can be generated based on the entire device context in real-time, providing more relevant content without compromising the security of data in the system.

The systems and methods of this technical solution can scan on-screen activities and information, such as interactions and text, along with additional device information to create a client device context. The client device context can be scanned in real-time, on a periodic basis, or only when an on-device content item must be generated. Using the context information of the client device, the systems and methods of this technical solution can generate one or more on-device content items using a content item model. The content item model can include a machine-learning model, a look-up table of strings and category information, or any other type of content selection solution. The on-device content items can be generated to include text, links, images, and videos, among other types of content. After generating the on-device content items using the model, the systems and methods of this technical solution can display the on-device content items on the client device. The client device can select a generated on-device content item for display using, for example, an on-device content selection model. In response to an interaction with the generated on-device content items, the systems and methods can transmit the interaction data from the client device to a content provider computing device, while also updating the content selection model and content generation model based on the interaction data. Thus, without transmitting contextual information to a content provider, the systems and methods of this technical solution can allow a client device to generate and display on-device, context-relevant content items.

Accordingly, the technical solution described herein can thus provide increased computational performance and reduce overall network utilization when compared with other content selection systems. Instead of continuously or periodically transmitting context information from the client device to a content provider server, this technical solution can generate content items using on-device context and transmit data in the event of an interaction. This can reduce the computational load on content provider computing systems, and decrease the overall network traffic between client devices and content providers. Furthermore, by only transmitting interaction data instead of device context information, this technical solution increases the overall security of content selection solutions, because protected or private context information does not leave the client device. Thus, the private or protected context information is not susceptible to data breaches or man-in-the-middle attacks, which is an improvement over other content provider systems.

FIG. 1 depicts a system 100 for generating on device content items to improve security and network resource utilization. The system 100 can include at least one computer network 110. The system 100 can include at least one content provider 115. The content provider 115 can include at least one stored interaction data 180. The content provider 115 can include at least one additional content 185. The system 100 can include at least one client device 105. The client device 105 can include at least one display 125, at least one content generation model 130, at least one content selection model 135, at least one storage 140, at least one application 160, at least one context scanner 165, at least one content generator 170, and at least one content selector 175. The storage 140 can include at least one resources 145, at least one event logs 150, at least one categories 155, and at least one context 158.

Figure 6:
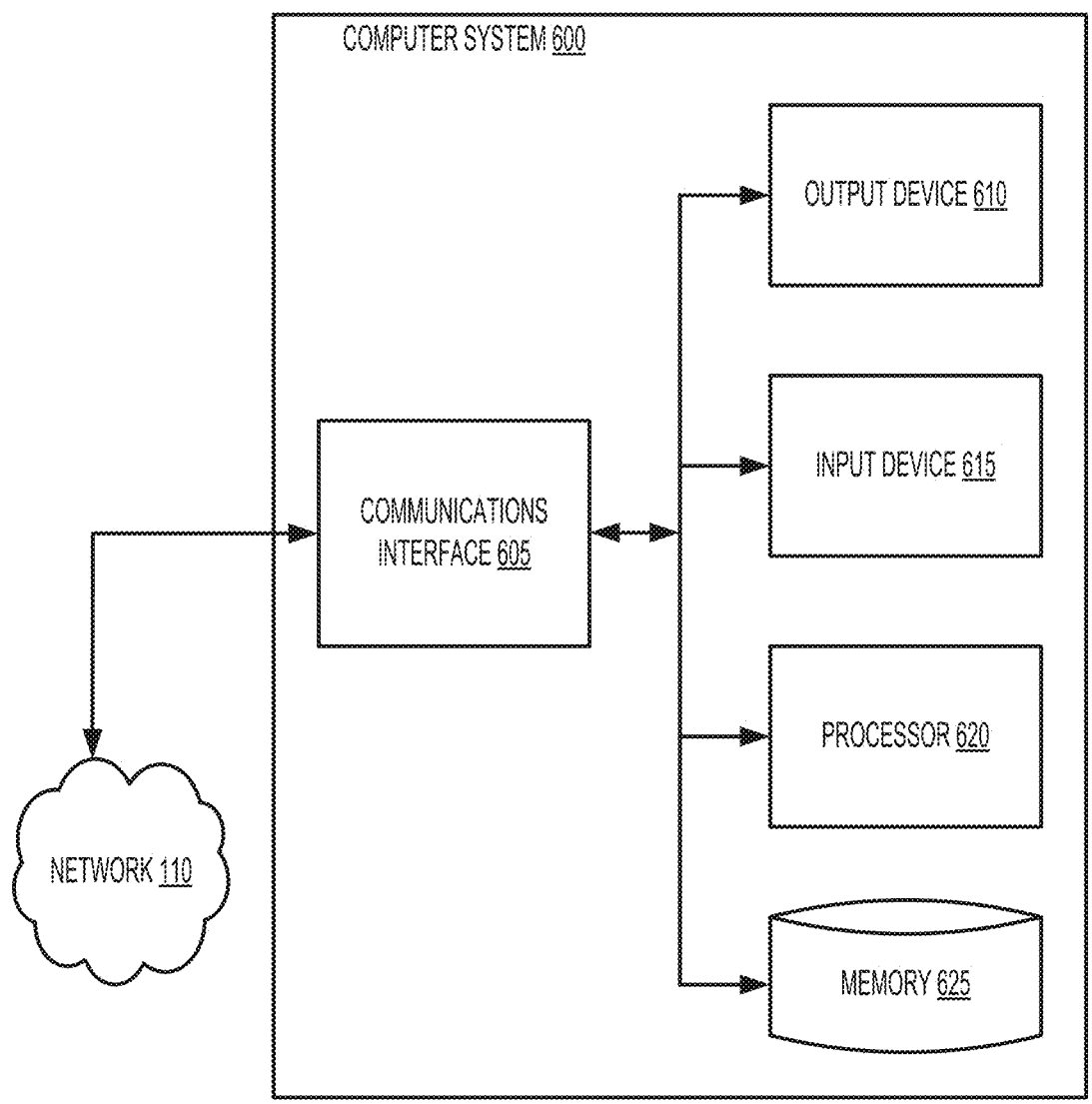
FIG. 6 shows the general architecture of an illustrative computer system that may be employed to implement any of the computers discussed herein.

Each of the components (e.g., the network 110, the content provider 115, the stored interaction data 180, the additional content 185, the client device 105, the display 125 the content generation model 130, the content selection model 135, the storage 140, the resources 145, the event logs 150, the categories 155, the context 158, the application 160, the context scanner 165, the content generator 170, the content selector 175) of the system 10 can be implemented using the hardware components or a combination of software with the hardware components of a computing system 600 detailed herein in conjunction with FIG. 6. For example, the client device 105 can include one or more computing devices. The content provider 115 can include servers or other computing devices. Each of the components of the client device 105 can perform the functionalities detailed herein.

The network 110 can include computer networks such as the Internet, local, wide, metro or other area networks, intranets, satellite networks, other computer networks such as voice or data mobile phone communication networks, and combinations thereof. The client device 105 of the system 100 can communicate via the network 110, for instance with at least one content provider 115. The network 110 may be any form of computer network that relays information between the content provider 115, client device 105, and one or more content sources, such as web servers, amongst others. In some implementations, the network 110 may include the Internet and/or other types of data networks, such as a local area network (LAN), a wide area network (WAN), a cellular network, a satellite network, or other types of data networks. The network 110 may also include any number of computing devices (e.g., computers, servers, routers, network switches, etc.) that are configured to receive and/or transmit data within the network 110. The network 110 may further include any number of hardwired and/or wireless connections. The client device may communicate wirelessly (e.g., via WiFi, cellular, radio, etc.) with a transceiver that is hardwired (e.g., via a fiber optic cable, a CAT5 cable, etc.) to other computing devices in the network 110. The client device 105 may also communicate wirelessly with the computing devices of the network 110 via a proxy device (e.g., a router, network switch, or gateway). The content provider 115 may communicate wirelessly (e.g., via WiFi, cellular, radio, etc.) with a transceiver that is hardwired (e.g., via a fiber optic cable, a CAT5 cable, etc.) to other computing devices in the network 110. The content provider 115 may also communicate wirelessly with the computing devices of the network 110 via a proxy device (e.g., a router, network switch, or gateway).

The client device 105 can include at least one processor and a memory, i.e., a processing circuit. The memory stores processor-executable instructions that, when executed by processor, cause the processor to perform one or more of the operations described herein. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions may include code from any suitable computer programming language. The client device 105 can include one or more computing devices or servers that can perform various functions.

The content provider 115 can include servers or other computing devices operated by a content provider entity to provide content items for display on information resources. The content provided by the content provider 115 can include third party content items for display on information resources, such as an information resource that includes primary content, e.g. content provided by the content provider 115. The content items can also be displayed on a search results web page. For instance, the content provider 115 can provide or be the source of content items for display in content slots of information resources, such as a web page of a company where the primary content of the web page is provided by the company, or for display on a search results landing page provided by a search engine. The content items associated with the content provider 115 can be displayed on information resources other than web pages, such as content displayed as part of the execution of an application on a smartphone or other client device. The functionality of the content provider 115 in the context of system 100 will be explained below.

The content provider 115 can include stored interaction data 180 received from one or more client devices 105. The stored interaction data 180 can include interaction information, such as timestamps, content type, content categories, resources, and other information about interactions with on-device content items. In some implementations, the stored interaction data 180 does not include any identifying information about the client device 105, and does not include any context information from the client device 105. Instead, the stored interaction data 180 can include information about generated on-device content items interacted with on the client device 105. The client device 105 can transmit, communicate, or otherwise provide the stored interaction data 180. Based on the stored interaction data 180, the content provider can determine additional content 185 that can be associated with the on-device content indicated in the stored interaction data 180.

The content provider 115 can include additional content 185. The additional content can be associated with one or more interactions or categories, for example the categories 155. Based on the stored interaction data 180, the content provider 115 can access the additional content 185 to identify and select one or more additional content 185 items to transmit, communicate, or otherwise provide to the client device 105 for display. The additional content 185 can include links, web-pages, images, text, video, or any other type of media. The additional content 185 can be associated with one or more keywords, metadata, or other information to facilitate content selection by the content provider 115. In some implementations, based on the stored interaction data 180, the content provider 115 can generate one or more additional content 185 items for transmission to the client device 105. The content provider 115 can transmit to the additional content 185 to the client device 105, for example, in response to one or more events. The one or more events can include receiving an indication of an interaction with an on-device content item, receiving information about the content generation model 130, receiving information about the content selection model 135, or receiving a request for additional content from the client device 105.

The content provider 115 can provide other information, data, or applications to the client device 105. For example, the content provider 115 can provide the resources 145, the categories 155, and other information to the client device 105 to facilitate the generation of on-device content items. After receiving this other information, the client device 105 can store, update, or otherwise maintain the other information in the memory of the client device 105, for example in one or more data structures in the storage 140. The content provider 115 can provide one or more applications, for example the application 160, or scripts to the client device 105. In some implementations, the content provider 115 can provide one or more template scripts to the client device 105. The client device 105, or one or of its components (e.g., the content generator 170), can populate the script template to facilitate the generation of on-device content items. The content provider 115 can provide one or more models to the client device 105, for example the content generation model 130 and the content selection model 135, among others. In response to receiving the one or more models from the content provider 115, the client device 105 can store, update, or otherwise maintain the models in the memory of the client device 105, for example in the storage 140.

The storage 140 can be a database configured to store and/or maintain any of the information described herein. The storage 140 can be stored in any appropriate type and form of data structure, such as an array, flat file, delineated file, or any other type and form of database file. The storage 140 can maintain one or more data structures, which can contain and/or index each of the values, pluralities, or thresholds described herein. In some implementations, the storage may be accessed using one or more memory addresses or index values. The storage 140 may be accessed by the modules of the client device 105, or the content provider 115 via the network 110. In some implementations, the storage 140 is internal to the client device 105. In some implementations, the storage 140 may exist external to the client device 105, and may be accessed via the network 110 or another communications interface. In some implementations, the storage 140 may be distributed across many different computer systems or storage elements, and may be accessed via the network 110 and/or a suitable computer bus interface. The client device 105 can store the results of any or all computations, determinations, selections, identifications, or calculations in one or more data structures indexed appropriate values, each of which may be accessed by the client device 105 or the content provider 115 to perform any of the functions described herein.

The client device 105 can be communicatively coupled to a display 125, which can be a liquid crystal display, active matrix display, light-emitting diode based display (LED), or an organic light-emitting diode display (OLED), among others. The display 125 can be configured to display information, for example from an application 160 executing on the client device 105, to a user. The display 125 can include a touch-sensitive input device, which can be configured to provide one or more indications of input events to the client device 105. The input events can include tap events, swipe events, drag-and-drop events, double-tap events, triple tap events, gesture events, or any other touch input based events or interactions. The display 125 can display any information, images, or graphical representations stored in the client device 105, and can display generated or selected on-device content items.

The client device 105 can access one or more content resources 145 or one or more categories 155 from a data structure in the storage 140. The content resources 145 can include, for example, text strings, text assets, image information, vector information (e.g., scalable vector graphics information, other graphics or drawing information or instructions, etc.), videos, animated images, and other content that can be included in a generated on-device content item. Each of the content resources 145 can include keywords or other identifying metadata. The client device 105 can match the metadata to one or more query to lookup terms to access specific content resources 145, or ranges or categories of the content resources 145. The categories 155 can include one or more content categories, such as locations, events, objects, interests, or other information relevant to content selection. In some implementations, the categories 155 can include a dependency graph, where each category 155 can point to one or more other related categories 155. Accessing the content resources 145 or the categories 155 can include copying, extracting, or moving the data from the storage 140 into a different region of computer memory on the client device 105, for example a region of working memory.

The content generator 170 can generate one or more on-device content items based on the content resources 145 and the categories 155. To generate the on-device content items, the client device 105 can iterate through and select each of the resources 145. As described above, each of the resources 145 can include keywords, metadata, pointers to related categories 155, or other identifying information. Based on the identifying information, the content generator 170 can identify and access each of the categories 155 that may be related, similar, or otherwise associated with the selected resources 145. The categories 155 can include additional related information that can facilitate content selection, for example keywords, metadata, device information, location information, or any other information to identify or associate the resource with a particular category of interest. For each of the selected resources 145, which can include text strings, images, video, or other media information, the client device 105 can associate the category information identified from the categories 155. For example, if the selected resource 145 includes information, metadata, keywords, or other information that identifies the selected resource 145 as a picture of a tropical beach, the content generator 170 can generate an on-device content item that includes the picture and text, for example stating "Hawaiian vacation," or other text that could be related to the picture or resources 145.

The content generator 170 can generate the one or more on-device content items by providing the content resources 145 and the categories 155 to the content generation model 130. In some implementations, the content generator 170 can apply one or both of the content resources 145 or the categories 155 to the input of the content generation model 130. The content generation model 130 can include any type of machine learning model (e.g., neural network, convolutional neural network, recurrent neural network, linear regression, sparse vector machine, etc.). The content generation model 130 can include multiple layers of weights and biases that are applied to the inputs of the model, for example the indications of the resources 145 or the categories 155. The content generation model 130 can output one or more indications of a resources, indications of keywords, keywords, or any other information to be included in an on-device content item. The content generation model 130 can identify or output associations between the resources 145 and the categories 155, and include those associations in the on-device content item. The on-device content item can include one or more scripts, that when activated by an event on the client device 105, can cause the client device to execute instructions to provide interaction information to the content provider 115.

The content generator 170 can receive, from the output of the content generation model 130, one or more on-device content items. The on-device content items can include, for example, any number of images, text, resource 145, keywords, content selection, scripts, and computer media, among others. In some implementations, the client device can receive one or more indications of what is to be included in the on-device content items from the content generation model 130. Based on these indications, which can be pointers to locations in the memory (e.g., the storage 140) of the client device 105, the client device 105 can access the memory (e.g., the storage 140) to select each of the resources 145 and categories 155 indicated by the content generation model 130. The content generator 170 can package the identified resources 145 and categories 155 into one or more on-device content items. Thus, based on the output of the content generation model 130, the content generator 170 can assemble, package, or otherwise generate on-device content items. After generating the on-device content items, the content generator 170 can access the memory (e.g., the storage 140) of the client device 105, and store the generated on-device content items in one or more data structures. The on-device content items can be generated to include metadata, for example metadata associated with one or more selection keywords, context metadata, location information, or any other type of content selection data. The content selection data can be extracted from the resources 145, the categories 155, or from any other data accessed via the client device 105. The content selection data can be included in each generated on-device content item to facilitate selection of content items for display on the client device 105.

The client device 105 can execute an application 160, which can include one or more instructions to display content on the display 125. The application 160 can include, for example, a web-browser, a game application, or another type of application that executes on the client device. The application 160 can provide context information to other components on the client device 105 through an API interface, or through other means of communication with the components of the client device 105. For example, the application 160 can provide regions of client device 105 memory that include device context information to other components of the client device 105. The context information can include text that is displayed to the user, text that is not displayed to the user, search queries, user input events, time values, time periods of usage in the application, facial recognition information, biometric information (e.g., fingerprints, eye color, hair color, etc.), and other information that may be used or accessed via the application 160. The application 160 can include instructions to display content items, or additional content that may be external to the application 160. The content items can populate one or more content item slots provided by the application 160. The application 160 executing on the client device 105 can provide one or more indications to the client device 105 to display, generate, or select a content item for display in the content slots. In some implementations, the application 160 can provide the indication to any one of the components of the client device 105.

The context scanner 165 can receive, from the application 160 executing on the client device 105, an indication to display a content item. The indication can include dimensions, context information, or a pointer to a region of memory in the client device to place the content item. The indication can include an indication to gather context information to select a particular content item, an indication to display a particular content item (e.g., including an indication of a particular content item in the memory of the client device 105, or an indication of a piece of additional content received from the content provider 115. In some implementations, the indication is a message that is transmitted to other components of the client device 105. The message can include information about the application 160, information about the content item slot, information about the client device 105, or information about a series of user interactions that preceded the request for an on-device content item. The indication can include a request to generate an on-device content item based on information provided by the application 160, include state, information displayed by the application 160, interaction information, query information, input information, or other information provided to or accessed by the application 160.

The context scanner 165 can scan the device context 158 of the client device 105 to create a device context 158 data structure in the memory (e.g., storage 140) of the client device 105. In some implementations, the context scanner 165 can update the device context in the memory of the client device 105 in response to detected changes in the device context. The context scanner 165 can access each and every interface, data structure, memory location, or other information associated, stored, or accessed by the client device 105 to construct or the device context in the memory (e.g., storage 140) of the client device 105. The context scanner 165 can create, update, or otherwise insert on-screen text information, interaction information, input information, past interaction information, past context information, location information, past location information, past on-screen text information, or other device information including device identifiers, device type, screen resolution information, hardware display information, or any other type of information accessible by the client device 105 into the device context 158. The context scanner 165 can access the event logs 150 of the storage 140 to access any interaction events, past content item interactions, or other event based information to include in the device context 158. The context scanner 165 can associate timestamp values with each entry in the device context 158 data structure, where each time stamp indicates the time the entry was created or updated by the context scanner 165. In some implementations, the past information can be updated accordingly to a time threshold value. If the difference between the current device time of the client device 105 and the time stamp of an entry in the device context 158 exceed the time threshold value, the context scanner 165 can update the corresponding entry in the device context 158. In some implementations, the context scanner 165 can scan the device to update or maintain the device context 158 on a periodic basis, a real-time basis, or when an indication for a request for content is received from the application 160.

The content selector 175 can select an on-device content item for display in the application 160. In some implementations, the content selector 175 can select an on-device content in response to receiving the indication or request to display a content item from the application 160. In some implementations, the content selector 175 can select on-device content for display in the application 160 in response to the context scanner 165 updating the device context 158. The content selector 175 can select on-device content from the on-device content items generated by the content generator 170 and stored in the memory (e.g., the storage, etc.) of the client device 105. The content selector 175 can access the storage 140 to retrieve the device context 158. The content selector 175 can use one or more entries in the device context 158 to select relevant content items. The content selector 175 can match one or more keywords, metadata, or selection information included in the on-device content items to information included in the device context 158. For example, if the device context 158 indicates that on-screen text includes the words "tropical," "island," and "vacation," the content selector 175 can use those words to search for and select relevant on-device content items for display. Accordingly, the content selector 175 may select an on-device content item that includes a picture of a tropical island, along with the caption "Hawaiian Vacation!" for display based on the context information. In another example, the location information in the device context 158 may indicate that the client device 105 is nearby many restaurants or food establishments. In response, the content selector 175 can select content related to food or restaurants. Although only described here in a limited capacity, it should be understood that the content selector can select content based on any of the context information types described herein, based on any of the possible metadata stored by the on-device content items generated by the content generator 170. By selecting the on-device content items based on the device context 158, the content selector can select the most up-to-date and relevant on-device content items for display.

The content selector 175 can provide the selected content to the application 160 for display in one or more content slots on the display 125 of the client device 105. Providing the on-device content item can include copying the on-device content item to a region of memory specified by the application 160, or to another type or region of memory specified by the application 160. After moving or copying the on-device content item data to the region of memory specified by the application 160, the content selector 175 can provide the application 160 with a signal that indicates the on-device content item is ready for display. The content selector 175 can provide a pointer to the location of the on-device content item to the application 160. The application 160 can access the location pointed to by the pointer to load the on-device content item into display memory 158, and display the on-device content item in one or more content slots in the application 160. In response to receiving the on-device content item, the application 160 can transmit an acknowledgement signal to the other components of the client device 105 to indicate that the on-device content item has been displayed. In some implementations, the application 160 can record the on-device content item display event in the storage 140, for example in the event logs 150. Accordingly, the application 160 can record each time an on-device content item was displayed in the application 160, along with an identifier of the generated content item, an identifier of the application, or other information that can facilitate training of the content selection model 135 or content generation model 130.

The content selector 175 can provide the device context 158 and any other related information to the content selection model 135 executing on the client device 105. The content selection model 135 can include any type of machine learning model (e.g., neural network, convolutional neural network, recurrent neural network, linear regression, sparse vector machine, etc.). The content selection model 135 can include multiple layers of weights and biases that are applied to the inputs of the model, for example the context 158 information retrieved from the storage 140. The content selection model 135 can output one or more indications of an on-device content item, thereby selecting an on-device content item for display in the application 160 of the client device 105. The content selection model 135 can identify one or more on-device content items for display in the application 160. In some implementations, the content selection model 135 can aggregate or combine one or more on-device content items into a single on-device content item for display in the application 160. For example, the content selection model 135 can select several smaller on-device content items that each contain related or common selection information (e.g., keywords, metadata, other association information, etc.) and combine them into a single, larger content item. The content selection model 135 can combine the content items in a grid format, or in a list format, where the list can be iterated through based on input events, time based events, or other information. Accordingly, the content selector 175 can receive, from the output of the content selection model 135, one or more selected on-device content items, or one or more aggregated selected on-device content items.

The application 160 executing on the client device 105 can record any or all events, including interaction events, input events, internal application events, operating system events, or other events, in the event logs 150 in storage 140. Accordingly, the application 160 can detect any or all input or interaction events with any links, on-device content items, or other information in the event logs 150. The application 160 can detect an interaction event associated with any of the displayed on-device content item. The interaction event can be a click, a tap, a swipe, or any other type of input described herein directed to the on-device content item displayed in the application 160. In response to the interaction events, the application 160 can execute one or more scripts associated with each of the corresponding on-device content items. The scripts can include instructions to provide or transmit information related to the interaction to the content provider 115 via the network 110.

The application 160, in response to the detected interaction event, can identify interaction information related to the detected interaction event. The interaction information can include any or all data associated with the corresponding on-device content item, including related keywords, metadata, or other information. The interaction information can further include information about the interaction, for example the time of the interaction, the location on-screen of the interaction, the type of interaction, or any other interaction information described herein. The application 160 can record any or all interaction events and related interaction information in the event logs 150 of the storage 140. In some implementations, the application can transmit an indication of the detected interaction, along with interaction information to the content provider 115 in response to a detected device interaction event. The application 160 can record any device context information associated with the interaction event in the event logs 150, so as to facilitate the training of the content generation model 130 or the content selection model 135. The application 160 can maintain one or more event logs 150 in the storage 140 in one or more data structures.

In response to a training condition, the client device 105 can train the content generation model 130 or the content selection model 135 based on the contents of the event logs. To facilitate generation and selection of relevant content items, the content generation model 130 and the content selection model 135 can be updated based on recorded interaction events with generated on-device content items. In this way, the content generation model 130 an the content selection model 135 can be improved based on input events received by the client device 105. The training condition can be, amongst other things, an indication that the client device 105 is charging, a message received from the content provider 115 or another external computing device via the network 110, or a request received at an input interface or an application interface of the client device 105. The client device 105 can train the models using any appropriate machine learning model training algorithm, including gradient descent, amongst others. Furthermore, the client device can access the interaction events recorded in the event logs 150 in batches. The batches can be used, for example, to train each of the content generation model 130 and the content selection model 135 in a batch process, when the device is not in use. In some implementations, the client device 105 can train each of the models in real-time in response to interaction events. In addition to the interaction information, the client device 105 can access the device context 158 to train the content generation model 130 or the content selection model 135. Training can include updating each of the models according to input events, interaction events, information received from the content provider 115, or other such information.

Figure 2:
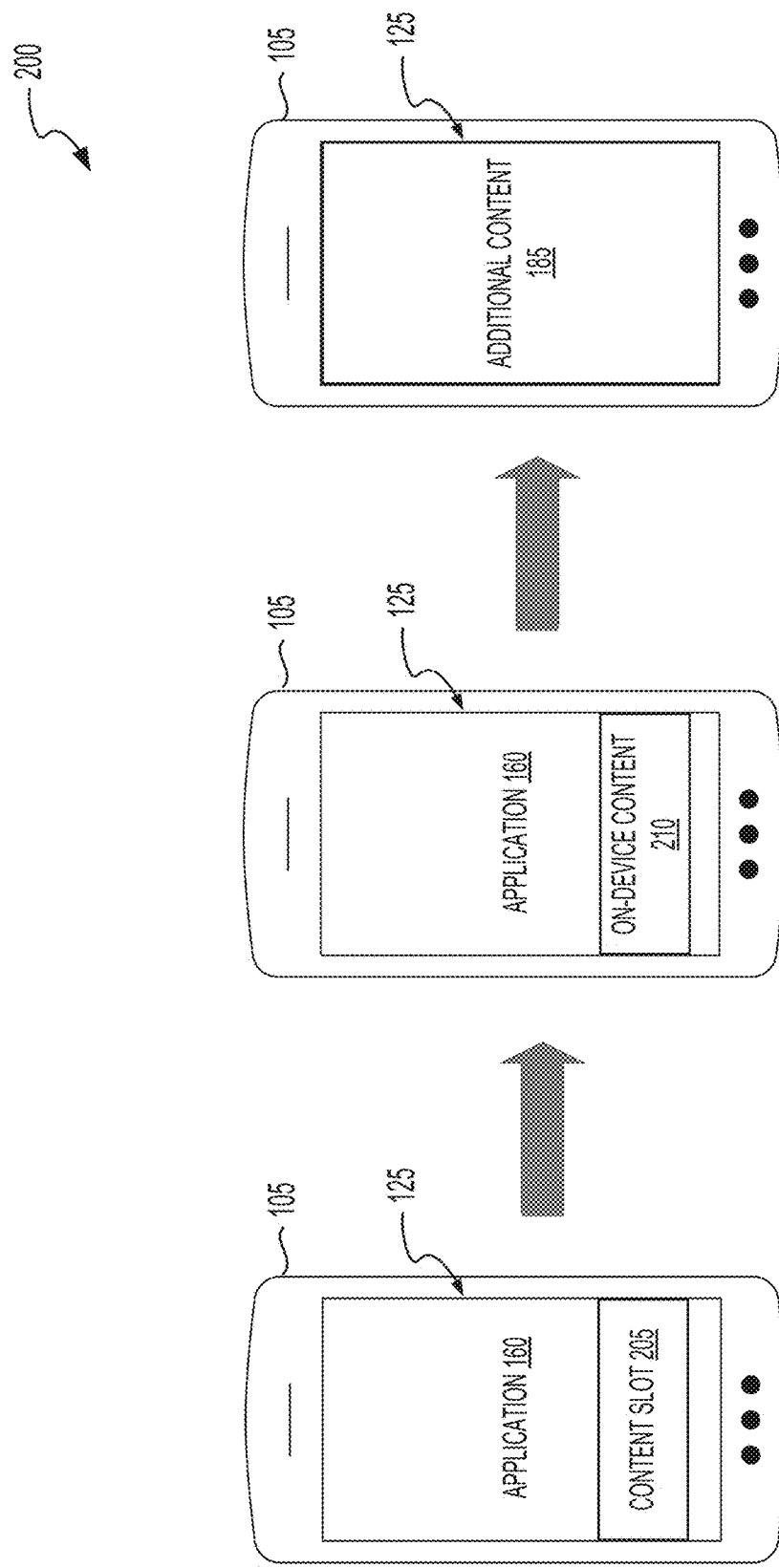
FIG. 2 shows an illustrative diagram of displaying an on-device content item in a content slot of an application executing on the client device.

Referring now to FIG. 2, depicted is an environment 200 illustrating an example diagram of displaying a generated on-device content item in a content slot 205 in the application 160. First, the application 160 is displayed on the display 125 of the client device 105. The application 160, as illustrated in this example implementation, includes a content slot 205, which can be used to display generated on-device content. Although depicted here as a rectangular area in the application 160, it should be understood that the content slot 205 can take up any shape, area, or position in the application 160. In some implementations, the content slot 205 may be hidden and not displayed on the application 160. In some implementations, the content slot itself will not be displayed until an on-device content item has been provided to the application 160.

Next, the application 160 has requested and received an on-device content item 210 for display in the content slot 205. The on-device content item can be displayed amongst other information resources in the application 160, and may be inserted into a web-page, application slot, any other type of content slot. The application 160 can be configured to detect any or all input events, and record those input events in the memory of the client device 105. The input events can include clicks, taps, swipes, or other input events or actions. If an input event is directed to the on-device content item 210, the application 160 can execute one or more scripts to identify interaction information.

The interaction information can include information about the on-device content item, information about the type of interaction, the duration of interaction, or other types of information. In some implementations, an interaction can simply include displaying the on-device content item for a predetermined period of time. In response to the interaction event information, the application 160 can provide the interaction information to a content provider, for example the content provider 115. The content provider 115 can receive the interaction information. Based on the received interaction information, the content provider 115 can select and transmit additional content 185 to the application 160 executing on the client device 105. The application, in response to receiving the additional content, can display the additional content in the application 160. Although depicted here as the additional content taking up the entire display 125 of the client device 105, it should be understood that the additional content 185 can include any form of content, and can take up any shape, size, area, or position in the application 160.

In some implementations, the additional content 185 can include a script, command, or uniform resource identifier (URI) to launch a different application 160. The additional content 185 can include an indication to cause the application 160 to navigate to a web-page, or a different menu or state of the application 160. This way, the application 160 can facilitate the selection of relevant additional content 185 for display on the client device 105 from the content provider 115 without providing updated device context 158 information to the content provider 115. This has the effect of reducing the overall number of network transmissions to the content provider, improving network resource utilization and computing resource utilization. Furthermore, by not allowing the device context 158 information to be transmitted on the network, there is a reduced risk that the device context 158 information will be subjected to data breaches or man-in-the-middle attacks.

Figure 3:
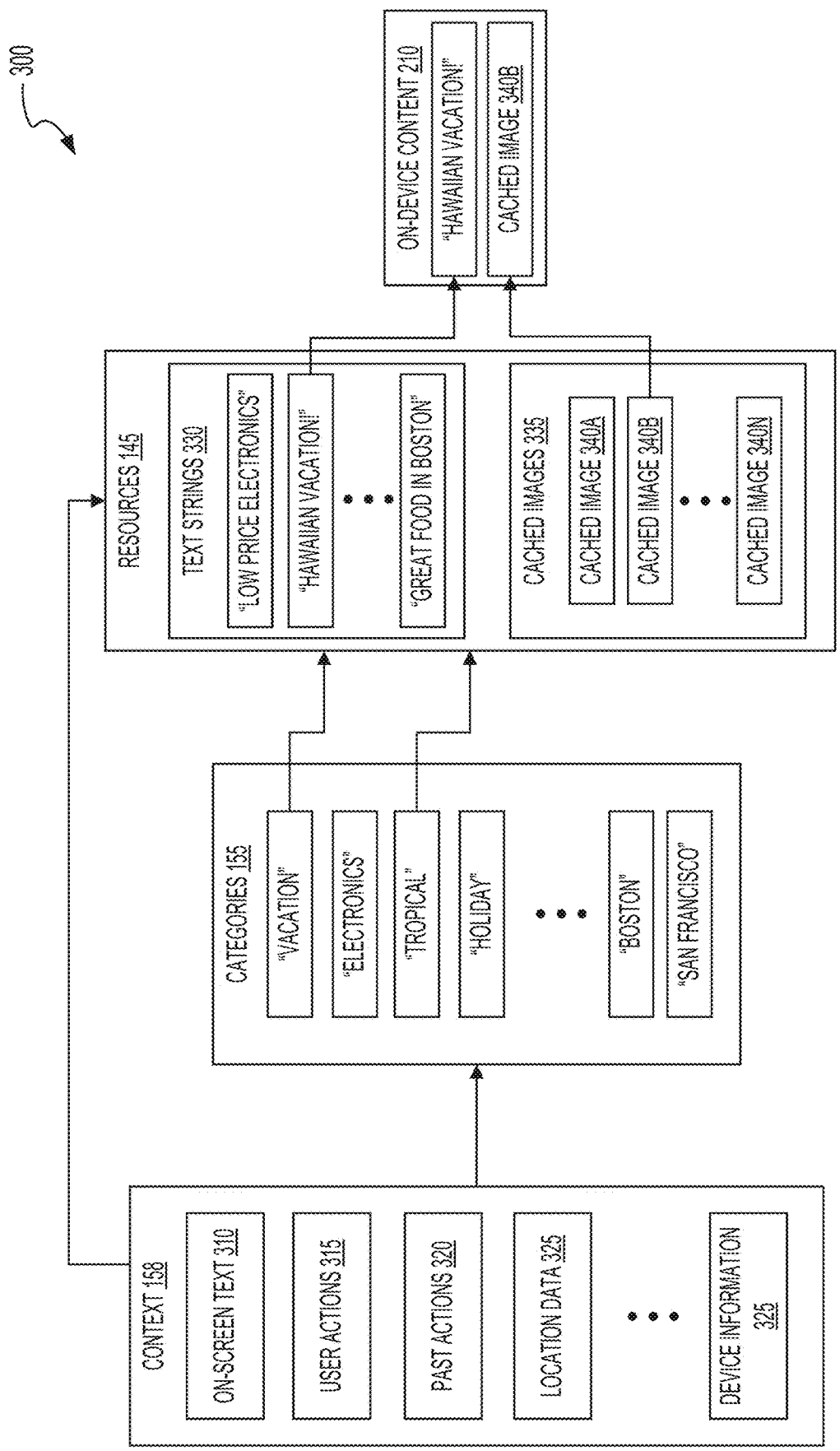
FIG. 3 shows an illustrative diagram of generating an on-device content item based on device context, content resources, and category information.

Referring now to FIG. 3, illustrated is a block diagram 300 depicting the generation of an on-device content item based on context 158 information, categories 155, and resources 145. As depicted here, the context 158 can include on-screen text 310, user actions 315, past actions 320, location data 325, and device information 327, among others. The categories 155 can include a number of strings that indicate certain categories of content, and can include additional metadata and keywords to select content based on each enumerated category. As depicted here in this example illustration, each of the categories 155 can be identified by a string value. The resources 145 can include both text strings 330 and cached images 335. Each of the image data 340A-N (sometimes referred to generally as image data 340) can include any format of video, audio, images, or other content, including JPEG, GIF, PNG, TIFF, MP4, M4V, MKV, and other media formats. Although not illustrated here, each of the image data 340 can include associated metadata and keywords, which can facilitate content selection and generation.

The diagram 300 illustrates the various parts of an on-device content item 210, and how they can be generated by the content generator 170, and by the content generation model 130. Although this diagram shows on-device content items 210 generated using context 158, content categories 155, and content resources 145, it should be understood that on-device content items can be generated, for example by the content generator 170 or the content generation model 130, using any combination of these elements, or none of these elements.

As illustrated in the diagram, the on-device content item 210 can be generated based on the device context 158, the categories 155, and the resources 145. Each of these items can be accessed, for example, from the storage 140 of the client device 105. The categories of content can be chosen or selected based on the context 158. The context information can include on-screen text 310, user actions 315, past actions 320, location data 325, and device information 327. Based on this information, the content generator 170 can select relevant categories 155. In this example, the on-screen text includes information about tropical islands and vacations. Accordingly, the content generator 170 has selected the "Vacation" and "Tropical" categories. Based on these categories 155 and the context 158 information, the content generator 170 can select relevant resources. In this example, the content generator 170 has matched the relevant keywords "Hawaiian vacation" and the image data 140B, which includes keywords or metadata related to the islands, vacations, or tropical locations. The content generator 170 can package each of the selected resources into the on-device content item 210, thereby generating the on-device content item.

Figure 4:
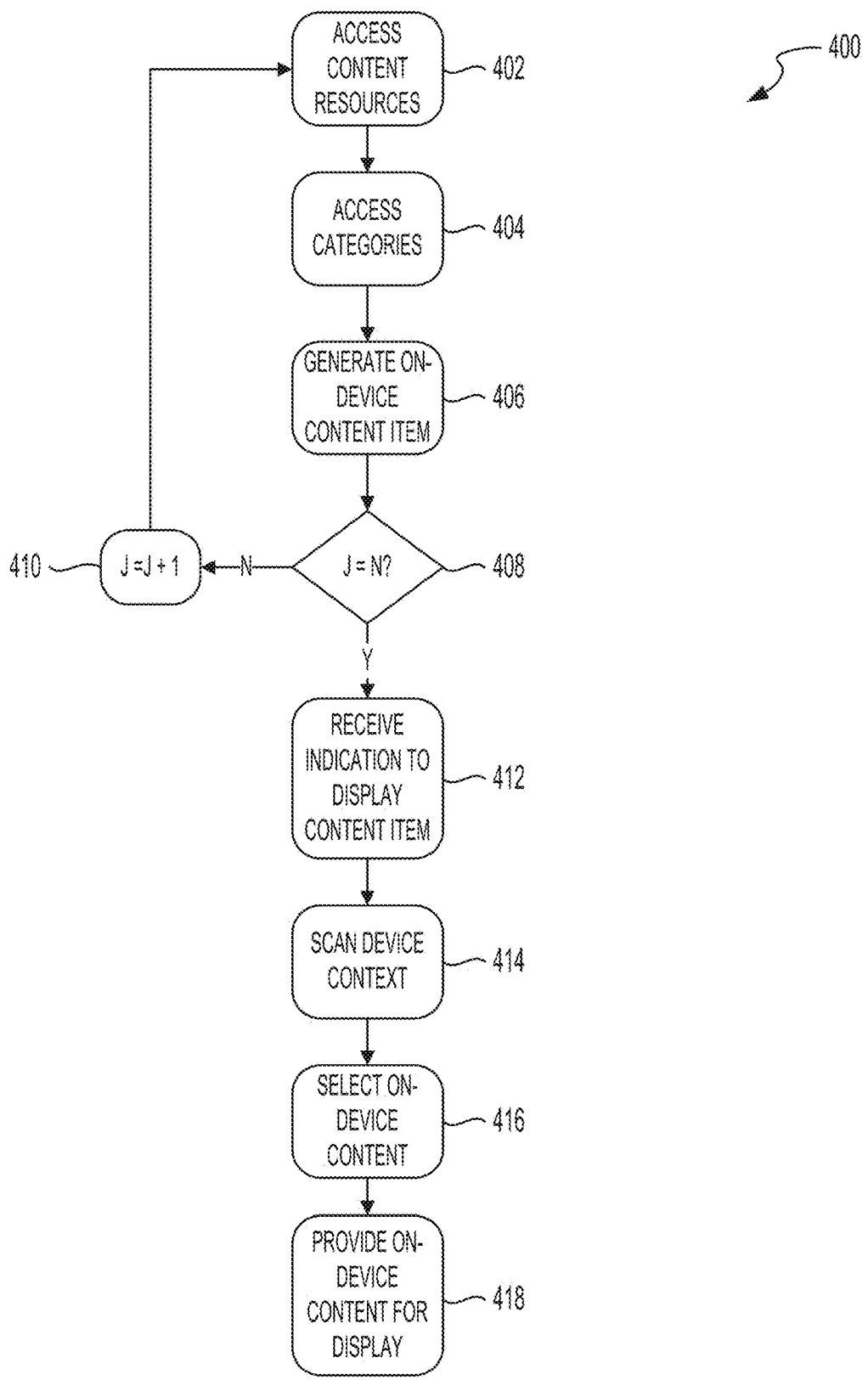
FIG. 4 shows a flow diagram of a method of generating on-device content items to improve security and network resource utilization.

Referring now to FIG. 4, illustrated is a flow chart of an example method 400 of generating on-device content items to improve security and network resource utilization. The method 400 can be performed or otherwise executed by the client device 105, the computer system 600 described herein in conjunction with FIG. 6, or any other computing devices described herein. A client device (e.g., the client device 105) can access content categories (ACT 402). The client device can access content resources (ACT 404). The client device can generate an on-device content item (ACT 406). The client device can determine whether the counter register j is equal to the number of categories and resources n (DECISION 408). The client device can increment the counter register j. The client device can receive an indication to display content (ACT 412). The client device can scan the device context (ACT 414). The client device can select on-device content (ACT 416). The client device can provide on-device content for display (ACT 418).

The client device (e.g., the client device 105) can access content categories (ACT 402). To generate on-device content items for each of the categories (e.g., the categories 155) stored on the client device, the client device can iteratively loop through each of the content categories based on a counter register j. Each of the content categories can be indexed in a data structure by an index value (e.g., index 0, index 1, index 2, etc.). To process a content category, the client device can select the content category that includes an index value equal to the counter register j. If it is the first iteration of the loop, the counter register j may be initialized to an initialization value (e.g. j=0) before selecting the j-th content category. Accessing the categories can include copying the data associated with the selected content category to a different region of computer memory, for example a working region of memory.

The client device can access content resources (ACT 404). The content category selected by the client device can be associated with one or more keywords, metadata, location information, or other content selection criteria. To properly identify resources that can be used to generate content relevant to the selected category, the client device can compare the keywords, metadata, location information, or content selection criteria of the selected category to the information in the content resources. The content resources can include text, metadata, and other information to facilitate selection. The content resources can also include images, video, or audio, where each of these non-textual media can be associated with one or more keywords describing the media, or metadata indicating an association with a content category. The client device can identify which of the content resources are relevant to the selected category, and select each of the relevant resources. Selecting the relevant resources can include copying the data associated with the identified resources to a different region of computer memory, for example a working region of memory.

The client device can generate an on-device content item (ACT 406). To generate an on-device content item, the client device can package each of the identified resources into a single content item. In some implementations, the client device can generate a single on-device content item for each of resources selected by the client device based on the selected category. In such implementations, each on-device content item can include one or more text strings, and one or more images. The client device can associate each generated on-device content item with the resources, metadata, keywords, and other content selection information to facilitate content selection. After generating each on-device content item, the client device can store the generated on-device content items in a data structure in the memory of the client device. In some implementations, the client device can associate each of the generated on-device content items with the selected content category. In some implementations, the client device can incorporate a script into the on-device content item. The script can be configured to cause the client device to communicate interaction information to a content provider (e.g., the content provider 115) in response to an interaction with the on-device content item. The interaction information can include information about the on-device content item, such as associated categories, keywords, metadata, and other content selection information, as well as information about the interaction, such as time of interaction, duration of interaction, type of interaction, and other event information. In some implementations, the client device can use a content generation model (e.g., the content generation model 130) to generate content. The client device can provide the selected categories and the selected content resources to the input of the content generation model, and receive the generated on-device content items at the output of the model.

The client device can determine whether the counter register j is equal to the number of categories and resources n (DECISION 408). To determine whether the client device has generated an on-device content item for each of the content resources and the content categories, the client device can compare the counter register used to select each content category to the total number of content categories n. If the counter register j is not equal to (e.g., less than) the total number of content categories n, the client device can execute (ACT 410). If the counter register j is equal to (e.g., equal to or greater than) the total number of content categories n, the client device can execute (ACT 412).

The client device can increment the counter register j. The client device can add one to the counter register j to indicate the next unprocessed categories in the data structure of content categories. In some implementations, the client device can set the counter register j to a memory address value (e.g., location in computer memory) of the next unprocessed content category. In some implementations, the memory address value of the next unprocessed content category can be included in the data structure at the location of the current (e.g., selected) retrieval token. After incrementing the value of the counter register j, the client device can execute (ACT 402) of the method 400.

The client device can receive an indication to display content (ACT 412). The indication can include information, such as dimensions, duration, position, and context information. The client device can receive the indication to display content from an application (e.g., the application 160) executing on the client device. The indication can include additional information such as an identifier corresponding to the application (e.g., the application identifier), and other content item information. In some implementations, the indication to display content can include an indication to display a particular on-device content item. In such implementations, the client device can execute (ACT 416), and skip (ACT 414), because the device context is not needed. Otherwise, the client device can execute (ACT 414).

The client device can scan the device context (ACT 414). Scanning the device context can include gathering data about the applications, services, and operating systems executing on the client device, and storing this information in one or more data structures in the memory of the client device. Scanning the device context can include requesting for information from one or more applications executing on the client device, where each request is for information about each application. The device context can include gathering location information, on-screen text information, off-screen text information, audio information, microphone information, device status information (e.g., battery level, internet connectivity, cellular connectivity, etc.), interaction information, application event information, operating system event information, and other information related to the client device.

The client device can select on-device content (ACT 416). To select one or more on-device content items that are relevant to the device context, the client device can access the device context. Using the accessed device context, the client device can compare the device context information, for example the on-screen text, location information, and other information about the client device, to the one or more generated on-device content items stored in the memory of the client device. If the keywords, metadata, or other content selection information associated with one or more on-device content items match that of the device context, the client device can select those content items. Selecting the content items can include copying the identified content items to a different region of memory, for example a working region of memory on the client device. In some implementations, the client device can select the one or more content items using a content selection model (e.g., the content selection model 135). For example, the client device can provide the device context information to the input of the content selection model The client device can provide on-device content for display (ACT 418). Providing the on-device content for display can include providing the one or more selected on-device content items to the application 160. The application can load each of the content items into display memory, and display each of the on-device content items in a respective content item slot. In some implementations, the client device can aggregate more than on-device content item into a single on-device content item, and include the aggregated on-device content item in a single content item slot. The provided on-device content item can be configured to communicate interaction information to a content provider server in response to an interaction with a content item. The client device can receive additional content (e.g., additional content 185) from the server. The additional content can be related to one or more categories associated with the generated on-device content corresponding to the interaction. The additional content can, for example, cause the client device to launch a different application, navigate to a webpage, or otherwise display the additional content in the application executing on the client device.

Figure 5:
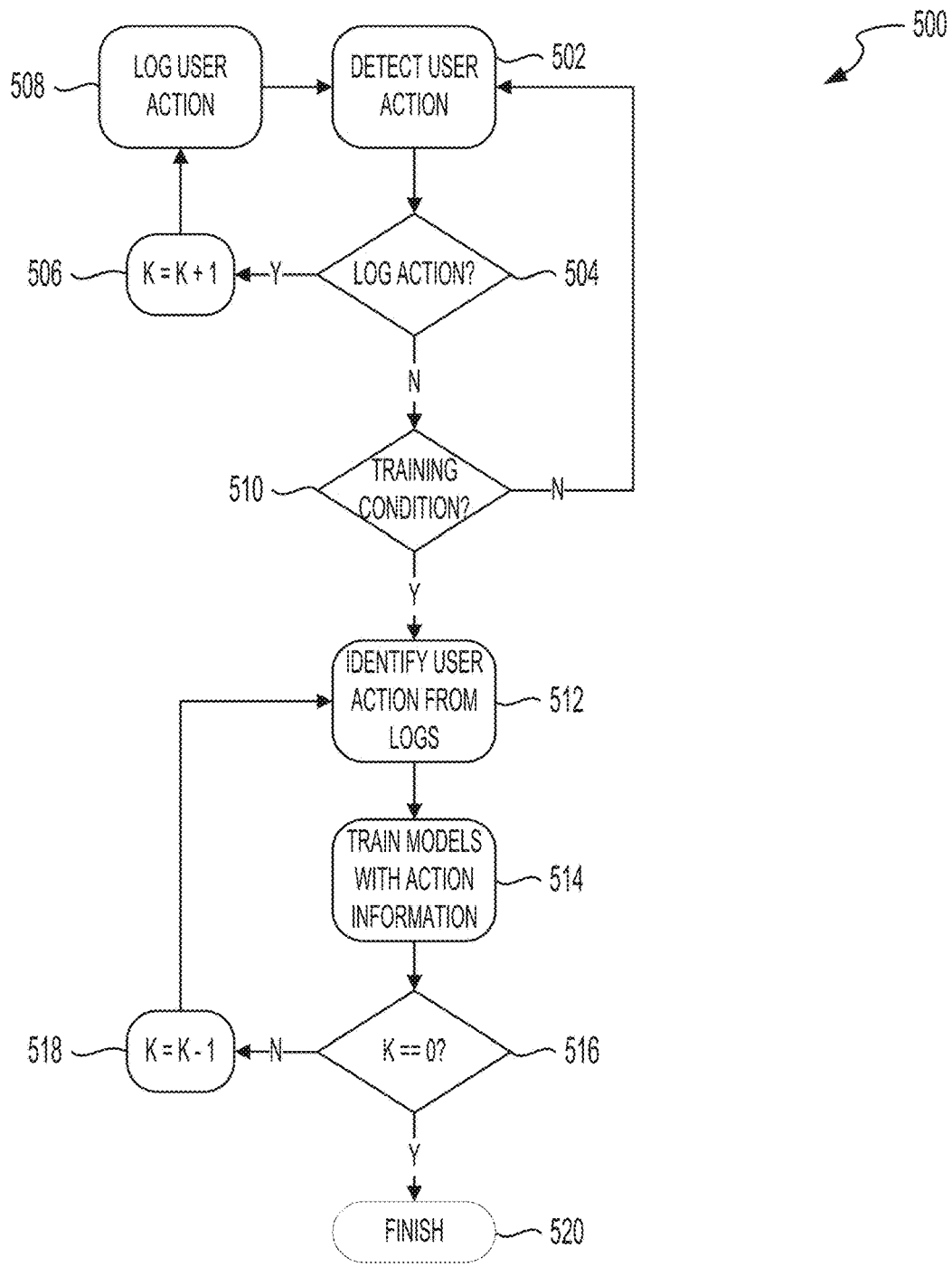
FIG. 5 shows a flow diagram of a method of updating a content selection model or a content generation model based on interaction information.

Referring now to FIG. 5, illustrated is a flow chart of an example method 500 of updating a content selection model or a content generation model based on interaction information. The method 500 can be performed or otherwise executed by the client device 105, the computer system 600 described herein in conjunction with FIG. 6, or any other computing devices described herein. A client device (e.g., the client device 105) can detect a user action (ACT 502). The client device can determine whether to log the action (DECISION 504). The client device can increment the counter register k (ACT 506). The client device can log the user action (ACT 508). The client device can determine whether the action was a training condition (DECISION 510). The client device can identify a user action from logs (ACT 512). The client device can train models with the action information (ACT 512). The client device can determine whether the counter register k is equal to zero (DECISION 516). The client device can decrement the counter register k (ACT 518). The client device can finish training (ACT 520).

The client device (e.g., the client device 105) can detect a user action (ACT 502). Detecting the user action can include utilizing one or more event listeners in an application (e.g., the application 160) displaying on-device content on the client device. The event listeners can be configured to detect interactions with one or more intractable elements displayed by the application, for example links, buttons, or on-device content items. The event listeners can also detect other device events, for example charging events (e.g., the client device has been plugged in to charge), inactivity events (e.g., inactive for a predetermined period of time, the current device time is within a certain period of the day or night, etc.), temperature events (e.g., the temperature of the device has exceeded a certain value, etc.). The detected action can include information about the type of action, the duration of the action, and any associated links, buttons, objects, or on-device contents items.

The client device can determine whether to log the action (DECISION 504). To determine whether to log the action, the client device can access an internal setting, a user-defined setting, or default profile information. For example, the client device may access one or more data structures in the memory of the client device that include settings or configuration information associated with the client device. The settings can indicate certain types of actions to log, and certain types of actions to ignore. If the settings indicate that interactions with on-device content items should be logged, the client device can determine that it should log all actions (e.g., interactions, etc.) associated with on-device content items. Likewise, if any other types of actions are indicated in the settings as actions that should be logged, the client device can determine that those identified types of actions should be logged. In some implementations, the client device can determine that the absence of an action is relevant to log. For example, the client device may determine that the lack of an interaction with a displayed on-device content item should be logged. In such implementations, the client device can create an "inactivity" action, which describes different parameters about the on-device content item(s) (e.g., duration of display, associated keywords, etc.), and parameters of the inactivity (e.g., durations of inactivity, other detected interactions, if any, etc.). If the client device determines that the detected user action should be logged, the client device can execute (ACT 506). If the client device determines that the detected action should not be logged, the client device can execute (ACT 510).

The client device can increment the counter register k (ACT 506). To log the total number of interactions to use as training data for the content models, the client device can add one to the counter register k to indicate the total count of the logged user actions. In some implementations, the client device can set the counter register k to a memory address value (e.g., location in computer memory) of the next location in memory for logging the user actions, for example in a data structure. If this is the first iteration of this loop, the client device can initialize the counter register k to an initial value, for example zero, before incrementing the counter register. After incrementing the value of the counter register k, the client device can execute (ACT 508) of the method 500.

The client device can log the user action (ACT 508). Logging the user action can include logging any information associated with any detected action, including device information, interaction information (e.g., type of interaction, duration of interaction, content involved in the interaction, frequency of interactions, timestamp of interaction, etc.). The user action can include actions taken by the operating system of the client device or an application executing on the client device. Accordingly, the client device can log any action, interaction, input event, or other type of event as it occurs, along with any information or parameters associated with the event. In some implementations, the client device can generate a data structure in the memory of the client device, and store the events in the data structure. The client device can update the data structure as new events are detected, or otherwise. Logging a user action can include logging if an inactivity event, including parameters about the corresponding on-device content item(s) (e.g., duration of display, associated keywords, etc.), and parameters of the inactivity (e.g., durations of inactivity, other detected interactions, if any, etc.). After logging the user action, the client device can perform (ACT 502) of the method 500. In some implementations, after performing (ACT 508), the client device can perform (ACT 512) of the method 500.

The client device can determine whether the action was a training condition (DECISION 510). A training condition can include an action that indicates the models (e.g., the content generation model 130, the content selection model 135, etc.) stored on the client device can be updated. The training condition can be an action detected by the client device (e.g., a user interaction, an indication that the device is being charged, an application event or automatic action, etc.). To determine whether a detected action is a training condition, the client device can compare the most recently detected action (e.g., by timestamp, etc.) with a training condition configuration setting. The client device can store a training condition configuration setting in the memory of the client device, for example in a data structure. The client device can access the data structure to determine whether the most recently detected action is a training condition. The configuration setting can include one or more rules that indicate whether any of the logged recorded actions include a training condition. If the most recently detected action (or another detected action, as specified by the configuration setting) is not determined to be a training condition, the client device can perform (ACT 502). If the most recently detected action (or another detected action, as specified by the configuration setting) is determined to be a training condition, the client device can perform (ACT 512).

The client device can identify a user action from logs (ACT 512). To train the models stored in the memory of the client device, the client device can identify training data stored in the memory of the client device. The training data can include, for example, interactions detected while displaying an on-device content item or inactivity detected while displaying an on-device content item, among others. To properly train the models, the client device must perform a training algorithm on one or more of the models using the logged actions as an input to the model. Accordingly, the client device can iteratively loop through and identify each of the logged user actions based on the counter register k. Each of the user actions can be indexed in a data structure in the memory of the client device by an index value (e.g., index 0, index 1, index 2, etc.). To access a user action for training, the client device can select the user action that includes an index value equal to the counter register k. The counter register, as established previously in the method 500, can maintain a count of the total number of logged user actions since the last training condition. Identifying the user actions from the logs can include copying the data associated with the identified user actions to a different region of computer memory, for example a working region of memory.

The client device can train models with the action information (ACT 512). Training the models can include performing a training algorithm (e.g., supervised learning, unsupervised learning, reinforcement learning, gradient descent algorithms, etc.). The client device can apply the identified user action, along with information about the device context, other detected actions, timestamps, input information, on-device content information, or other information as feedback into the model. By training the models stored in memory, the client device can facilitate relevant content selection based on additional information about the content items. Training the models based on detected actions can include adjusting the weights, biases, or parameters of the model to facilitate relevant on-device content generation or selection.

The client device can determine whether the counter register k is equal to zero (DECISION 516). To determine whether the client device has trained the models using each of the logged actions, the client device can compare the counter register k used to select each logged action to the value of zero. Once the counter register k is equal to zero, the client device can finish training each model. If the counter register j is not equal to (e.g., greater than) the value of zero, the client device can execute (ACT 518). If the counter register j is equal to (e.g., equal to or less than) the value of zero, the client device can execute (ACT 520).

The client device can decrement the counter register k (ACT 518). To train the content models using each of the actions logged by the client device, the client device can subtract one from the counter register k to indicate the next unprocessed logged user action in the memory of the client device. In some implementations, the client device can set the counter register k to a memory address value (e.g., location in computer memory) of the next unprocessed logged user action. After decrementing the value of the counter register k, the client device can execute (ACT 512) of the method 500.

The client device can finish training (ACT 520). Finishing training can performing one or more actions to reinitialize the models. For example, the changes to the models generated by the training steps can be stored in a different region of memory on the client device, for example non-volatile storage (e.g., the storage 140) of the client device. In some implementations, the client device can transmit a message to the content provider (e.g., the content provider 115) indicating that the client device has performed training on the models. In some implementations, the client device can transmit the changes to the models to the content provider.

FIG. 6 shows the general architecture of an illustrative computer system 600 that may be employed to implement any of the computer systems discussed herein in accordance with some implementations. The computer system 600 can be used to provide information via the network 110 for display. The computer system 600 of FIG. 6 comprises one or more processors 620 communicatively coupled to memory 625, one or more communications interfaces 605, and one or more output devices 610 (e.g., one or more display units) and one or more input devices 615. The processors 620 can be included in the client device 105.

In the computer system 600 of FIG. 6, the memory 625 may comprise any computer-readable storage media, and may store computer instructions such as processor-executable instructions for implementing the various functionalities described herein for respective systems, as well as any data relating thereto, generated thereby, or received via the communications interface(s) or input device(s) (if present). Referring again to the system 600 of FIG. 6, the client device 105 can include the memory 625 to store information related to the sets of user identifiers, the generated vectors, among others. The processor(s) 620 shown in FIG. 6 may be used to execute instructions stored in the memory 625 and, in so doing, also may read from or write to the memory various information processed and or generated pursuant to execution of the instructions.

The processor 620 of the computer system 600 shown in FIG. 6 also may be communicatively coupled to or control the communications interface(s) 605 to transmit or receive various information pursuant to execution of instructions. For example, the communications interface(s) 605 may be coupled to a wired or wireless network, bus, or other communication means and may therefore allow the computer system 600 to transmit information to or receive information from other devices (e.g., other computer systems). While not shown explicitly in the system of FIG. 6, one or more communications interfaces facilitate information flow between the components of the system 600. In some implementations, the communications interface(s) may be configured (e.g., via various hardware components or software components) to provide a website as an access portal to at least some aspects of the computer system 600. Examples of communications interfaces 605 include user interfaces (e.g., web pages), through which the user can communicate with the computer system 600.

The output devices 610 of the computer system 600 shown in FIG. 6 may be provided, for example, to allow various information to be viewed or otherwise perceived in connection with execution of the instructions. The input device(s) 615 may be provided, for example, to allow a user to make manual adjustments, make selections, enter data, or interact in any of a variety of manners with the processor during execution of the instructions. Additional information relating to a general computer system architecture that may be employed for various systems discussed herein is provided further herein.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, i.e., one or more components of computer program instructions, encoded on computer storage medium for execution by, or to control the operation of, data processing apparatus. The program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can include a source or destination of computer program instructions encoded in an artificially-generated propagated signal. The computer storage medium can also be, or be included in, one or more separate physical components or media (e.g., multiple CDs, disks, or other storage devices).

The features disclosed herein may be implemented on a smart television module (or connected television module, hybrid television module, etc.), which may include a processing module configured to integrate internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services, a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate implementations, the features may be implemented on a laptop computer or other personal computer, a smartphone, other mobile phone, handheld computer, a tablet PC, or other computing device.

The operations described in this specification can be implemented as operations performed by a data processing apparatus on data stored on one or more computer-readable storage devices or received from other sources.

The terms "data processing apparatus", "data processing system", "user device", "client device", or "computing device" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The elements of a computer include a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), for example. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), plasma, or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can include any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as the client device 105 can include clients and servers. For example, the client device 105 can include one or more servers in one or more data centers or server farms. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular implementations of the systems and methods described herein. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. For example, the client device 105 could be a single module, a logic device having one or more processing modules, one or more servers, or part of a search engine.

Having now described some illustrative implementations and implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed only in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation, and references to "an implementation," "some implementations," "an alternate implementation," "various implementation," "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. Although the examples provided herein relate to controlling the display of content of information resources, the systems and methods described herein can include applied to other environments. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A method for generating a plurality of on-device content items to improve security and network resource utilization, comprising:
    accessing, by a client device including one or more processors and a memory, a plurality of content resources and a plurality of category information from a data structure in the memory of the client device;
    generating, by the client device, a plurality of on-device content items based on the plurality of content resources and the plurality of category information;
    receiving, by the client device, from an application executing on the client device, an indication to display a content item;
    scanning, by the client device, device context information associated with the client device to create a relevant device context;
    selecting, by the client device, a relevant on-device content item from the plurality of on-device content items based on the relevant device context;
    providing, by the client device, the relevant on-device content item to the application for display on the client device;
    detecting, by the client device, an interaction event associated with the relevant on-device content item;
    identifying, by the client device, interaction information based on the detected interaction event; and
    transmitting, by the client device, the interaction information to a content provider server.

2. The method of claim 1, further comprising:
    receiving, by the client device, from the content provider server, additional content based on the interaction information.

3. The method of claim 1, further comprising:
    receiving, by the client device, from a content provider server, the plurality of content resources and the plurality of category information.

4. A method for generating the plurality of on-device content items to improve security and network resource utilization, comprising:
    accessing, by a client device including one or more processors and a memory, a plurality of content resources and a plurality of category information from a data structure in the memory of the client device;
    generating, by the client device, the plurality of on-device content items based on the plurality of content resources and the plurality of category information;
    receiving, by the client device, from an application executing on the client device, an indication to display a content item;
    scanning, by the client device, device context information associated with the client device to create a relevant device context;
    selecting, by the client device, a relevant on-device content item from the plurality of on-device content items based on the relevant device context; and
    providing, by the client device, the relevant on-device content item to the application for display on the client device,
    wherein generating the plurality of on-device content items further comprises:
        providing, by the client device, the plurality of content resources and the plurality of category information to a content generation model executing on the client device; and
        receiving, by the client device, the plurality of on-device content items from an output of the content generation model.

5. The method of claim 4, further comprising:
    receiving, by the client device from a content provider server, the content generation model.

6. The method of claim 4, further comprising:
    detecting, by the client device, an interaction event associated with the relevant on-device content item; and
    updating, by the client device, the content generation model based at least one of the relevant context information or the interaction event.

7. A method for generating a plurality of on-device content items to improve security and network resource utilization, comprising:
    accessing, by a client device including one or more processors and a memory, a plurality of content resources and a plurality of category information from a data structure in the memory of the client device;
    generating, by the client device, the plurality of on-device content items based on the plurality of content resources and the plurality of category information;
    receiving, by the client device, from an application executing on the client device, an indication to display a content item;
    scanning, by the client device, device context information associated with the client device to create a relevant device context;
    selecting, by the client device, a relevant on-device content item from the plurality of on-device content items based on the relevant device context; and
    providing, by the client device, the relevant on-device ontent item to the application for display on the client device,
    wherein selecting the relevant on-device content item further comprises:
        providing, by the client device, the relevant device context to a content selection model executing on the client device; and
        receiving, by the client device, an indication of the relevant on device content item of the plurality of on-device content items from an output of the content selection model.

8. The method of claim 7 further comprising:
    receiving, by the client device from a content provider server, the content selection model.

9. The method of claim 7, further comprising:
    detecting, by the client device, an interaction event associated with the relevant on-device content item; and
    updating, by the client device, the content selection model based at least one of the relevant context information or the interaction event.

10. A system for generating on-device content items to improve security and network resource utilization, the system including a client device comprising one or more processors and a memory, the one or more processors configured to:
- access a plurality of content resources and a plurality of category information from a data structure in the memory of the client device;
- generate a plurality of on-device content items based on the plurality of content resources and the plurality of category information;
- receive, from an application executing on the client device, an indication to display a content item;
- scan device context information associated with the client device to create a relevant device context;
- select a relevant on-device content item from the plurality of on-device content items based on the relevant device context;
- provide the relevant on-device content item to the application for display on the client device;
- detect an interaction event associated with the relevant on-device content item;
- identify interaction information based on the detected interaction event; and
- transmit the interaction information to a content provider server.

11. The system of claim 10, wherein the one or more processors are further configured to:
- receive, from the content provider server, additional content based on the interaction information.

12. The system of claim 10, wherein the one or more processors are further configured to:
- receive, from a content provider server, the plurality of content resources and the plurality of category information.

13. A system for generating a plurality of on-device content items to improve security and network resource utilization, the system including a client device comprising one or more processors and a memory, the one or more processors configured to:
- access a plurality of content resources and a plurality of category information from a data structure in the memory of the client device;
- generate the plurality of on-device content items based on the plurality of content resources and the plurality of category information, at least by
  - providing the plurality of content resources and the plurality of category information to a content generation model executing on the client device, and
  - receiving the plurality of on-device content items from an output of the content generation model;
- receive, from an application executing on the client device, an indication to display a content item;
- scan device context information associated with the client device to create a relevant device context;
- select a relevant on-device content item from the plurality of on-device content items based on the relevant device context; and
- provide the relevant on-device content item to the application for display on the client device.

14. The system of claim 13, wherein the one or more processors are further configured to:
- receive, from a content provider server, the content generation model.

15. The system of claim 13, wherein the one or more processors are further configured to:
- detect an interaction event associated with the relevant on-device content item; and
- update the content generation model based at least one of the relevant context information or the interaction event.

16. A system for generating a plurality of on-device content items to improve security and network resource utilization, the system including a client device comprising one or more processors and a memory, the one or more processors configured to:
- access a plurality of content resources and a plurality of category information from a data structure in the memory of the client device;
- generate the plurality of on-device content items based on the plurality of content resources and the plurality of category information, at least by
- receive, from an application executing on the client device, an indication to display a content item;
- scan device context information associated with the client device to create a relevant device context;
- select a relevant on-device content item from the plurality of on-device content items based on the relevant device context, at least by
  - providing the relevant device context to a content selection model executing on the client device; and
  - receive an indication of the relevant on device content item of the plurality of on-device content items from an output of the content selection model; and
- provide the relevant on-device content item to the application for display on the client device.

17. The system of claim 16, wherein the one or more processors are further configured to:
- receive, from a content provider server, the content selection model.

18. The system of claim 16, wherein the one or more processors are further configured to:
- detect an interaction event associated with the relevant on-device content item; and
- update the content selection model based at least one of the relevant context information or the interaction event.

* * * * *

UNITED STATES PATENT AND TRADEMARK OFFICE
CERTIFICATE OF CORRECTION

Page 1 of 1

PATENT NO. : 12,445,468 B2
APPLICATION NO. : 17/278580
DATED : October 14, 2025
INVENTOR(S) : Matthew Nirvan Sharifi et al.

It is certified that error appears in the above-identified patent and that said Letters Patent is hereby corrected as shown below:

On the Title Page

Item (57), Line 5, "the memory the memory" should be -- the memory --.

In the Claims

At Column 27, Line 26, "a plurality" should be -- the plurality --.

At Column 27, Line 55, "the plurality" should be -- a plurality --.

At Column 28, Line 26, "based at least" should be -- based on at least --.

At Column 28, Line 48, "ontent" should be -- content --.

At Column 28, Line 66, "based at least" should be -- based on at least --.

At Column 29, Line 1, "generating" should be -- generating a plurality of --.

At Column 29, Line 9, "a plurality" should be -- the plurality --.

At Column 30, Line 15, "based at least" should be -- based on at least --.

At Column 30, Line 38, "device; and" should be -- device, and --.

At Column 30, Line 39, "receive" should be -- receiving --.

At Column 30, Line 52, "based at least" should be -- based on at least --.

Signed and Sealed this
Tenth Day of February, 2026

John A. Squires
*Director of the United States Patent and Trademark Office*